United States Patent
Maheshwari et al.

(10) Patent No.: US 11,704,307 B2
(45) Date of Patent: Jul. 18, 2023

(54) INTELLIGENT QUERY EDITOR USING NEURAL NETWORK BASED MACHINE LEARNING

(71) Applicant: Oracle International Corporation, Redwood Shores, CA (US)

(72) Inventors: Arvind Kumar Maheshwari, Pleasanton, CA (US); Vamshidhar Reddy Pasham, Hyderabad (IN); Ravi Kumar Agrawal, Noida (IN)

(73) Assignee: Oracle International Corporation, Redwood Shores, CA (US)

( * ) Notice: Subject to any disclaimer, the term of this patent is extended or adjusted under 35 U.S.C. 154(b) by 260 days.

(21) Appl. No.: 17/133,278

(22) Filed: Dec. 23, 2020

(65) Prior Publication Data
US 2022/0197900 A1 Jun. 23, 2022

(51) Int. Cl.
*G06F 16/00* (2019.01)
*G06F 16/242* (2019.01)
*G06N 3/08* (2023.01)

(52) U.S. Cl.
CPC .......... *G06F 16/2423* (2019.01); *G06N 3/08* (2013.01)

(58) Field of Classification Search
CPC .......... G06F 16/2423; G06F 16/90324; G06F 16/242; G06N 3/08
See application file for complete search history.

(56) References Cited

U.S. PATENT DOCUMENTS

| 6,108,648 A | 8/2000 | Lakshmi et al. |
| 2011/0313999 A1 | 12/2011 | Bruno et al. |
| 2015/0269176 A1* | 9/2015 | Marantz ............ G06F 16/90324 |
| | | 707/767 |
| 2019/0325292 A1 | 10/2019 | Remis et al. |
| 2019/0384863 A1 | 12/2019 | Sirin et al. |
| 2020/0349161 A1 | 11/2020 | Siddiqui et al. |
| 2021/0034588 A1 | 2/2021 | Burger et al. |

(Continued)

FOREIGN PATENT DOCUMENTS

WO 2018/200979 A1 11/2018

OTHER PUBLICATIONS

Wikipedia contributors. (Jan. 10, 2022). Neural network. In Wikipedia, The Free Encyclopedia. Retrieved 04:45, Jan. 26, 2022, from https://en.wikipedia.org/w/index.php?title=Neural_network&oldid=1064879516 (Year: 2022).

(Continued)

*Primary Examiner* — Tyler J Torgrimson
(74) *Attorney, Agent, or Firm* — Invoke

(57) ABSTRACT

Techniques are described herein for generating, editing, and optimizing queries using neural networks. In some embodiments, the techniques include training a neural network using a set of performant database queries to automatically learn patterns between different sequences of tokens in performant queries. Once trained, the neural network may receive an incomplete query as input, where the incomplete query includes one or more query tokens. The trained neural network may then perform next token prediction to project a set of one or more additional query tokens that may follow the one or more query tokens in the incomplete query to form a completed, performant query.

20 Claims, 8 Drawing Sheets

(56) References Cited

U.S. PATENT DOCUMENTS

2021/0056108 A1   2/2021  Shmueli et al.
2022/0121636 A1*  4/2022  Zheng ................. G06F 16/2237

OTHER PUBLICATIONS

Sak et al., "Long Short-Term Memory Recurrent Neural Network Architectures for Large Scale Acoustic Modeling", 15th Annual Conference of the International Speech Communication Association, Sep. 14-18, 2014, 5 pages.

Basik F. et al., "DBPal: A Learned NL-Interface for Databases," Proceedings of the 2018 International Conference on Management of Data, May 2018, pp. 1765-1768.

* cited by examiner

INTELLIGENT QUERY EDITOR USING NEURAL NETWORK BASED MACHINE LEARNING

CROSS-REFERENCE TO RELATED APPLICATIONS

This application is related to U.S. application Ser. No. 16/747,919, filed Jan. 21, 2020, which is hereby incorporated by reference.

TECHNICAL FIELD

The present disclosure relates to machine learning and query processing systems. In particular, the present disclosure relates to training, tuning, and leveraging neural networks for optimizing query performance.

BACKGROUND

Application developers are often responsible for writing queries to retrieve data that satisfy a set of criteria from a database. In modern environments, the amount of analytical and transactional data stored in databases may be vast, increasing the risk of non-performant database queries. A database query that is non-performant may cause a query processing system to inefficiently use compute and memory resources during query execution. In some cases, non-performant queries may jeopardize the health of a database, preventing concurrent processes from being able to access data in a timely manner. The negative effects may include application performance degradation, data loss, and data corruption.

Writing a performant query has traditionally required reasonable database expertise, intricate knowledge of the database schema, and an understanding of structured query language (SQL) execution plans. Acquiring such knowledge is typically a time-intensive process for application developers. Further, even seasoned database administrators may be prone to overlooking sub-optimal expressions and making errors when writing database queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
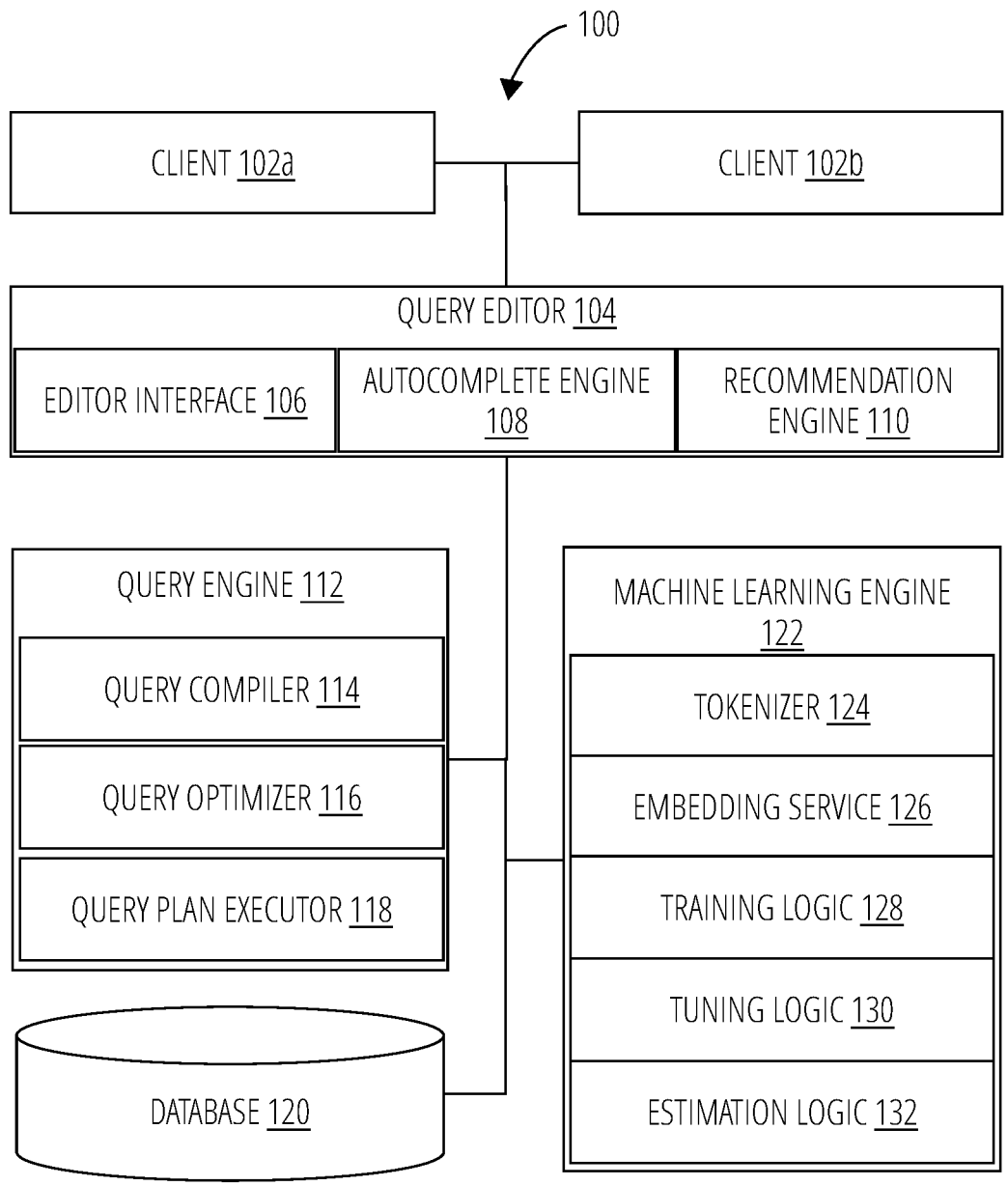
FIG. 1 illustrates a system for automatically generating, editing, and optimizing queries using machine learning according to some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 General Overview
2.0 System Architecture
3.0 Leveraging Machine Learning to Edit Queries
   3.1 Model Layers and Dataflow Examples
   3.2 NLP Layer Training and Architecture
   3.3 Embedding Layer for Converting Queries to Numerical Vectors
   3.4 Model Tuning
4.0 Real-Time Query Composition and Editing using Machine Learning
5.0 Computer Networks and Cloud Networks
6.0 Microservice Applications
7.0 Hardware Overview
8.0 Miscellaneous; Extensions 1.0 General Overview Techniques are described herein for generating, editing, and optimizing queries using neural network-based machine learning. In some embodiments, the techniques include training a neural network using a set of performant database queries to automatically learn patterns between different sequences of tokens in performant queries. Once trained, the neural network may receive an incomplete query as input, where the incomplete query includes one or more query tokens. The trained neural network may then perform next token prediction to project a set of one or more additional query tokens that are most likely to follow the one or more query tokens in the incomplete query to form a completed, performant query.

In some embodiments, the output of the neural network model is used to find similar performant queries. A similar query may include tokens that overlap with the completed, performant query output by the neural network model. One or more of the similar queries may have tokens that differ from those in the incomplete query initially processed by the neural network. Additionally or alternatively, one or more of the similar queries may have identical tokens. The similar queries may be extracted from a list of known, performant queries to reduce the risk of executing a non-performant query.

In some embodiments, the completed query and/or one or more similar queries that satisfy the similarity threshold are presented to a user during query composition. For example, as the user is typing the query into a user interface, the trained neural network may predict and present the most probable set of query tokens to follow the tokens typed in via the user interface. Additionally or alternatively, the system may identify and present the top n similar performant queries to the auto-completed query. The user may be given the option to select, save, and/or execute one or more of the presented queries. If the user selects a query, it may be fed again as input into the trained neural network to predict what additional query tokens might be added to expand the selected query and/or known, performant queries that are similar to the auto-expanded query.

One or more embodiments described in this Specification and/or recited in the claims may not be included in this General Overview section.

2.0 System Architecture

FIG. 1 illustrates system 100 for automatically generating, editing, and optimizing queries using machine learning according to some embodiments. As illustrated in FIG. 1, system 100 includes client 102a and client 102b, query editor 104, query engine 112, database 120, and machine learning (ML) machine learning engine 122. System 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In some embodiments, client 102a and client 102b are applications or application components that submit requests to store and fetch data to/from database 120. The requests may include or be used to construct a database query that conforms to a structured language, such as SQL. For example, a software application or component within an application layer of a multi-tier application, such as an application server, may submit a data manipulation language (DML) command to add, delete, and/or modify data within database 120. As another example, a client may submit a data definition language (DDL) command to define, modify, and remove the data structures, such as tables and schemas, to control how the underlying data is stored and related.

In some embodiments, query editor 104 comprises logic to facilitate the composition and optimization of queries. Query editor 104 may include editor interface 106, autocomplete engine 108, and recommendation engine 110. Query editor 104 may be part of one or more client applications such as client 102a or client 102b. In other embodiments, query editor 104 may be part of a separate backend application or cloud service, such as a database server.

In some embodiments, editor interface 106 provides an interface through which users and/or applications may compose new queries. Example user interfaces include graphical user interfaces (GUIs), application programming interfaces (APIs), web interfaces, command line interfaces (CLIs), haptic interfaces, and voice command interfaces. Editor interface 106 may be configured to render user interface elements and receive input via user interface elements. Example user interface elements include checkboxes, radio buttons, dropdown lists, list boxes, buttons, toggles, text fields, date and time selectors, command lines, sliders, pages, forms, and voice prompts. For example, editor interface 106 may include a textbox and/or other graphical user interface (GUI) elements, displayed within an application page or webpage, through which a user may type SQL commands, query expressions, and/or other query tokens. As the user is inputting the query tokens, editor interface 106 may present, through one or more GUI elements displayed on the same page, recommended SQL expressions and/or similar queries in real-time based on what query tokens have been input.

In some embodiments, autocomplete engine 108 includes logic for suggesting query tokens to complete an incomplete query and/or expand on a completed query. Autocomplete engine 108 may receive, via editor interface 106, one or more query tokens as input. In response, autocomplete engine 108 may use a trained machine-learning (ML) model, such as an artificial neural network, to predict/recommend one or more query tokens to add sequentially to the input query tokens in order to complete or expand the query.

In some embodiments, recommendation engine 110 includes logic for identifying performant queries to recommend to a user via editor interface 106. Recommendation engine 110 may receive, as input, a completed query output by autocomplete engine 108. In response, recommendation engine 110 may identify queries that satisfy a similarity threshold, such as the top n most similar queries from a list of performant queries.

In some embodiments, query engine 112 processes incoming queries received from database clients, such as client 102a and client 102b, submitted via query editor 104. Query engine 112 may be a component of a database server that provides database services to other computing applications and network hosts. Client 102a and/or client 102b may be remote from the database server and submit the requests over one or more network connections, or may reside on the same network host as query engine 112 and/or query editor 104.

Query engine 112 generally comprises query compiler 114, query optimizer 116, and query plan executor 118. In some embodiments, query compiler 114 generates query execution plans for incoming queries. Query compiler 114 may include a parser for performing syntactic and semantic processing. The parser may separate different query expressions and/or other tokens of a query into data structures, such as row source operators, representing steps of a query execution plan. A row source operator defines what data flows in, operations performed on the data, if any, and what data flows out for a given step of the query execution plan. Each step of the plan may correspond to one or more operations, such as performing scans, joins, deletes, updates, numerical operations, logical operations, data segmentation, etc. A query execution plan may comprise a tree of steps, such as a chain of linked row source operators, where the output of one step flows as input to a parent step in the tree until a final query result is generated.

In some embodiments, query compiler 114 checks one or more caches to determine whether code may be reused for the query. If a submitted SQL statement matches one that has been cached, then the code that was previously generated by query compiler 114 may be reused. A soft parse allows optimization and plan generation to be skipped, which may reduce query execution times. If existing code cannot be reused, then a hard parse may be performed, where a new set of one or more execution plans is generated and optimized.

In some embodiments, query optimizer 116 evaluates different possible candidate query execution plans and selects one of the candidates to execute the query. As previously indicated, each query execution plan may comprise a set of steps that may be executed by query plan executor 118 to generate a query result. There may be several possible different combinations of steps that produce the same correct query result. In some cases, query optimizer 116 may select the execution plan with the lowest estimated cost. However, other heuristics and/or rules may also be used to select query execution plans, depending on the particular implementation. Once the candidate query execution plan had been selected, query compiler 114 may convert the execution plan into code that is executable by query plan executor 118.

In some embodiments, query plan executor 118 executes the code of the optimized query execution plan to fetch, manipulate, and/or store data to/from database 120. For example, query plan executor 118 may perform a full table scan, build an index, perform a join, and/or execute other database operations to provide a final query result.

Database 120 may be stored on any type of storage unit and/or device. Further, database 120 may include multiple different storage units and/or devices. The multiple different storage units and/or devices may or may not be of the same type or located at the same physical site. Further, database 120 may be implemented on the same computing system as other components of system 100 or may reside on a separate computing system, such as a separate network host. In some embodiments, database 120 is implemented by a storage server. Other components of system 100 may be communicatively coupled to database 120 via a direct connection or via a network.

Machine learning (ML) engine 122 provides components through which inferences about query performance and adjustments to database queries may be automatically made during query composition rather than relying on static instruction sets to perform tasks. In some embodiments, ML engine 122 may be configured to automatically learn and infer query patterns associated with performant queries. ML engine 112 may provide hints to query editor 104 for completing and/or optimizing a query. For example, ML engine 114 may learn patterns between different query tokens that are relevant to each other and suggest, via autocomplete engine 108, tokens that are most likely to follow the query tokens a user has currently typed into editor interface 106.

In some embodiments, ML engine 122 includes tokenizer 124, which receives a set of queries or query expressions as input and automatically extracts a set of query tokens. A query token may be a data object, such as a string value, that identifies one or more words of a query text. For example, a query token may correspond to a database command (e.g., a SELECT, UPDATE, INSERT INTO, DELETE, CREATE TABLE, or other SQL statement), a clause (e.g., WHERE, FROM, FOR, etc.), a predicate (e.g., specified conditions that may be evaluated to true, false, or unknown), and/or a reference to a database object (e.g., a table, view, or database schema name). A token may uniquely identify a single word, referred to as unigram, or a sequence of two or more words, referred to as an n-gram, within the query.

ML engine 122 may further include embedding service 126, which is configured to generate vector representations for queries and/or query tokens. A vector representation may be a set of numerical values that facilitate processing by other components of ML engine 122. In some embodiments, each unique token may be mapped to a unique vector representation. For example, a SELECT statement may be represented by one ML vector, a WHERE clause by another, etc.

In some embodiments, ML engine 122 includes training logic 128 for training an ML model, such as an artificial neural network. Training logic 128 may receive, as input, a set of labeled queries to train a set of nodes of a neural network, as described further herein. A label may be descriptive in nature or may capture one or more metric values. For example, each query may be labeled as performant or non-performant to train an ML model to learn patterns among query expressions contained in performant queries and/or non-performant queries.

In some embodiments, ML engine 122 includes tuning logic 130 for adjusting and refining model parameters to optimize the model accuracy. For example, tuning logic 130 may train multiple candidate neural network models using varying model parameter sets. Tuning logic 130 may determine which model yields the lowest prediction/estimation error on average and select these parameters to evaluate new queries.

In some embodiments, ML engine 122 includes estimation logic 132 for evaluating new sequences of query tokens input via editor interface. For example, estimation logic 132 may perform next token prediction to predict which tokens are most likely to follow a set of tokens input by the user. Estimation logic 132 may apply the trained machine learning model to sequences of query tokens that have never been seen or executed within a production and/or testing environment.

In some embodiments, one or more components of system 100, such as ML engine 122, may be integrated into a cloud service, such as a software-as-a-service (SaaS), platform-as-a-service (PaaS), or web service. Clients, such as client 102a and client 102b, may be a web browser, mobile application, or other software application communicatively coupled to a network. A client may interact with cloud services using one or more communication protocols, such as the hypertext transfer protocol (HTTP) and/or other communication protocols of the Internet Protocol (IP) suite. In other embodiments, the components may be locally accessible to a user, such as via a desktop or other standalone application.

Components of system 100 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Additional embodiments and/or examples relating to computer networks and microservice applications are described below in Section 5.0, titled "Computer Networks and Cloud Networks" and Section 6.0, titled "Microservice Applications".

3.0 Leveraging Machine Learning to Edit Queries 3.1 Model Layers and Dataflow Examples In some embodiments, query tokens from incomplete or complete queries are input into a top-layer of a multilayered model that produces recommended edits and/or fully formed queries. Model layers below the top-layer may receive one or more inputs from other layers in the model and produce one or more output values. A model layer may comprise one or more models itself and/or other logic to generate the output values.

Figure 2:
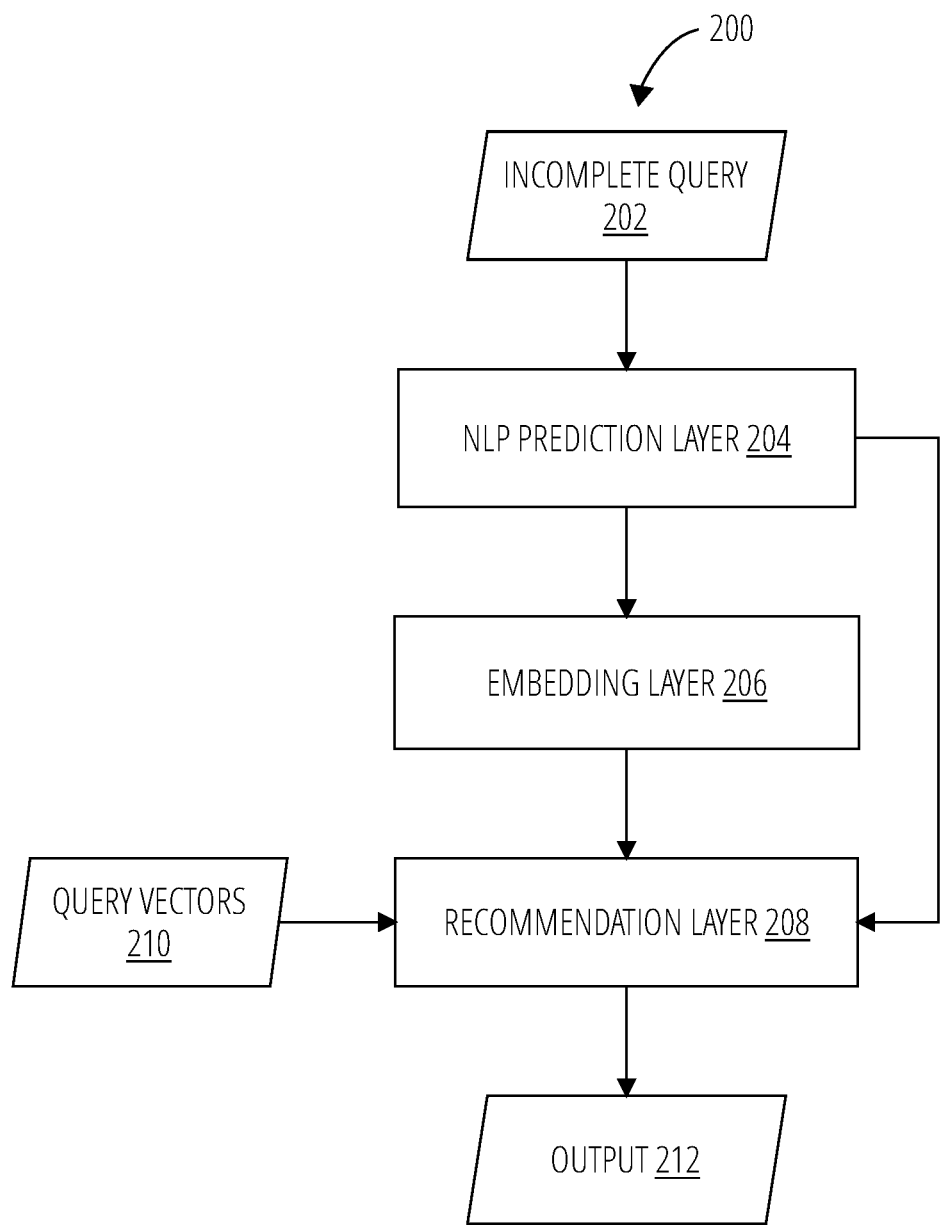
FIG. 2 illustrates a data flow for processing an incomplete query according to some embodiments.

FIG. 2 illustrates model 200 including multiple layers for processing an incomplete query according to some embodiments. As illustrated in FIG. 2, model 200 includes natural language processing (NLP) prediction layer 204, embedding layer 206, and recommendation layer 208 Model 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

In some embodiments, model 200 receives incomplete query 202 and, in response, generates output 212. Incomplete query 202 may comprise one or more query tokens, such as SQL commands, clauses, and/or object references. Additionally or alternatively, model 200 may receive complete queries as input. Output 212 may comprise one or more query tokens to complete or otherwise add to incomplete query 202. For queries that are already complete, output 212 may include one or more query tokens to expand the query. Additionally or alternatively, output 212 may include suggestions for similar queries that have been identified as performant.

In some embodiments, NLP prediction layer 204 includes an ML model that is trained to perform next token prediction. Next token prediction may include next word prediction, where the next query token in a sequence is predicted, or next sentence prediction, where the next sequence of query tokens is predicted. In some embodiments, the next token prediction produces one or more tokens that form a complete query when added to incomplete query 202. However, in other embodiments, the one or more query tokens may not form a fully completed query if added to incomplete query 202 but may be generated to quickly expand on incomplete query 202. The one or more query tokens may comprise SQL tokens, predicted by NLP prediction layer 204, to be most likely entered next by the user.

In some embodiments, embedding layer 206 converts the output of NLP prediction layer 204 into a numerical vector representation. For example, NLP prediction layer 204 may provide an internal suggestion to autocomplete incomplete query 202 to embedding layer 206. In response, embedding layer 206 may use a word embedding model to map query tokens within the autocompleted query to different numeric values.

In some embodiments, recommendation layer 208 receives the autocompleted query from NLP prediction layer 204 and/or its numerical vector representation from embedding layer 206. Recommendation layer 208 may use the numerical vector representation to identify one or more of query vectors 210 that satisfy a similarity threshold. In a preferred embodiment, cosine similarity may be used to compute the similarity between two numerical query vectors. However, other similarity measures, such as Euclidean distance, may also be used depending on the particular implementation.

The similarity threshold may be defined in terms of how many queries to find. For example, recommendation layer 208 may be configured to identify the top n most similar query as determined by cosine similarity or another similarity measurement, where n is a positive integer. In other embodiments, recommendation layer 208 may be configured to identify queries with a similarity value that exceeds or otherwise satisfies a threshold value. A similar query may include all of the query tokens included in incomplete query 202. In other cases, a similar query may include a subset or even none of the query tokens if it is sufficiently similar to an autocompleted query.

In some embodiments, query vectors 210 include numerical vector representations for a set of performant database queries. The performant database queries may be of the same schema and/or from the same database environment as incomplete query 202. For example, the performant database queries may be from the same production environment. The set of performant database queries may include queries that have been manually and/or automatically labeled as performant. Queries within a database environment may be automatically labeled or selected as a function of one or more performance metrics. Example metrics include execution time, CPU utilization, input/output (I/O) operations per second, average I/O throughput per second, and average wait time by database sessions. If the performance metrics for a query satisfy one or more performance thresholds within a target database environment, then it may be added to a list of performant database queries. Additionally or alternatively, the numerical vector representation may be computed and stored in a list of numerical vector representations for performant queries. Queries that do not satisfy the performance thresholds may be excluded from the list to avoid recommending SQL expressions or database queries that risk degrading database performance.

Output 212 may include the autocompleted query, the subset of tokens predicted by NLP prediction layer 204 to add to the tokens of incomplete query 202 to form the autocompleted query, and/or one or more queries that satisfy a similarity threshold. Output 212 may be returned to one or more components of system 100. For example, recommendation engine 110 may receive output 212 and present recommendations for completing incomplete query 202 via editor interface 106.

3.2 NLP Layer Training and Architecture

In a preferred embodiment, NLP prediction layer 204 includes bidirectional encoder representations from transformers (BERT) trained from a set of performant database queries to perform next token prediction for autocompleting incomplete query 202. BERT is an NLP technique that uses bidirectional training of a transformer model for language modeling. A transformer is a deep learning model that uses neural networks to process sequential data, such as a sequence of query tokens. However, with bidirectional training, transformers do not require sequential data to be processed in order. Bidirectional language models may capture insights into language context and flow between query tokens that single-direction language models are not able to learn. However, other models may be used to perform next token prediction. Examples include recurrent neural networks (RNNs), sequence-to-sequence models, and word2vec-based neural network models.

Figure 3:
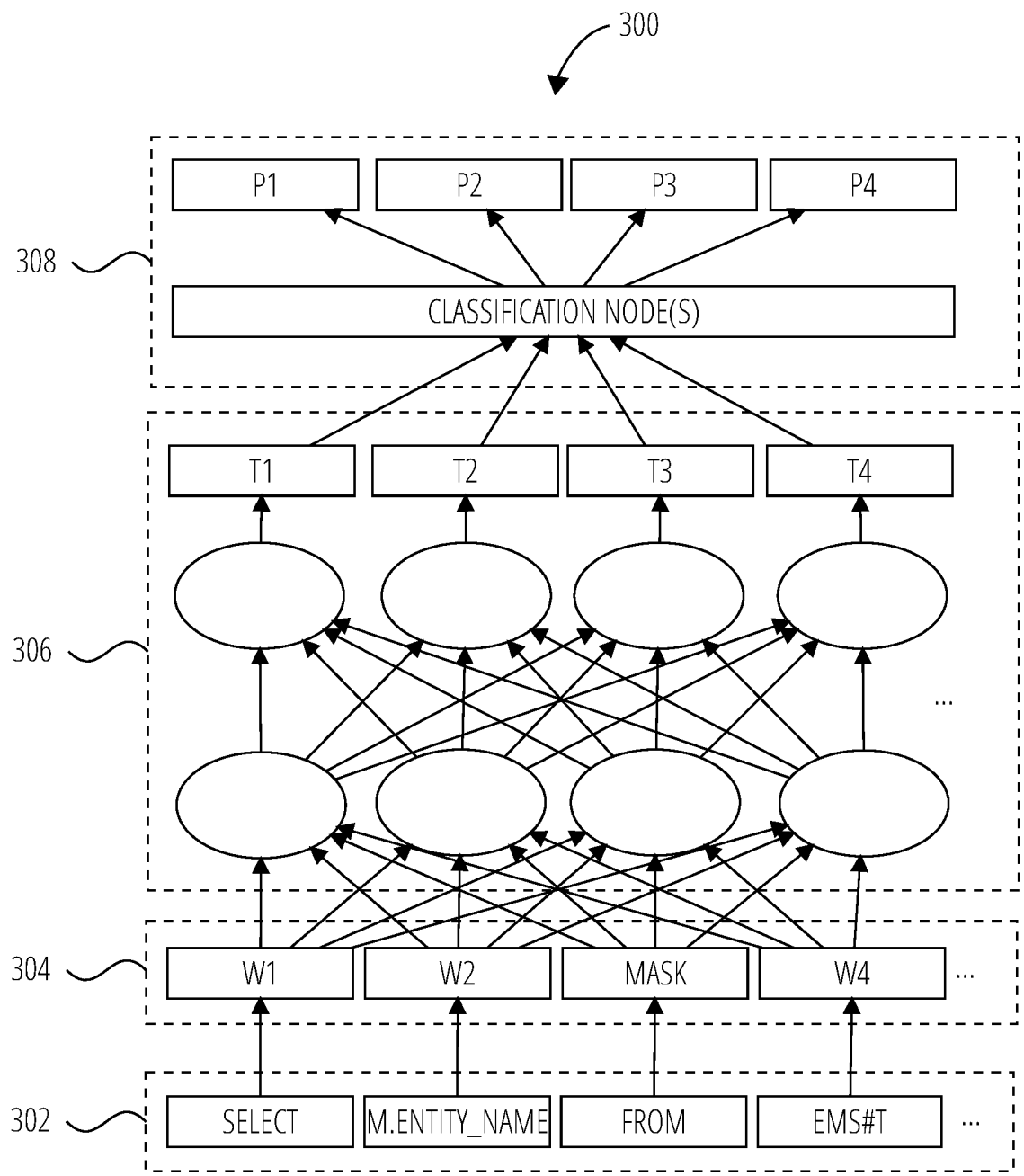
FIG. 3 illustrates a neural network architecture that includes bidirectional encoder representations from transformers according to some embodiments.

FIG. 3 illustrates neural network architecture 300 that includes bidirectional encoder representations from transformers according to some embodiments. Neural network architecture 300 includes input layer 302 which comprises a set of input SQL tokens from a query, which may be extracted from a complete or incomplete query.

In some embodiments, neural network architecture 300 includes word embedding layer 304, which converts query tokens into ML vectors for training or applying a ML model. Word embedding layer 304 may convert input tokens to numerical vector representations. Word embedding layer 304 may use the same word embeddings as embedding layer 206 or different embeddings, depending on the implementation. Word embedding layer 304 may mask one or more tokens during training of the model.

In some embodiments, neural network architecture 300 includes transformer encoder layer 306. Transformer encoder layer 306 may transform word embeddings received from embedding layer 206 into a set of one or more transformer encodings. Example encodings generated by transformer encoder layer 306 may include token embeddings, sentence embeddings, and/or positional embeddings. Transformer encoder layer 306 may include a set of one or more encoders to generate corresponding transformer encodings. An encoder may include a self-attention mechanism that weighs the relevance of query tokens relative to each other to generate the set of transformer encodings. An encoder may further include a feed-forward neural network to process encodings individually. The encodings from one encoder may be fed as input into another encoder. Transformer encoder layer 306 may read the entire sequence of query tokens, including positional information for each token, at once allowing the encodings to capture information about a query token based, in part, on query tokens both to the left and right of it. Thus, transformer encoder layer 306 may learn the context of a query tokens in view of all the surrounding query tokens to model relationships between different sequences of query tokens. For example, given a query with two distinct sequences of SQL tokens, the model may learn whether the second sequence of tokens is random or a probabilistically linked to the first set of query tokens.

In some embodiments, neural network architecture 300 includes transformer decoder layer 308. Each decoder within transformer decoder layer 308 may include a self attention mechanism and a feed forward neural network, similar to the encoders. Additionally, each decoder may include an attention mechanism to extract information about the encodings received from transformer encoder layer 306 and/or the output of other decoders. Additionally or alternatively, transformer decoder layer 308 may include a set of one or more classification nodes to produce output probabilities for the query tokens (or sequences of tokens). A classification node may perform a lineal transformation and/or apply a softmax function to the output of the decoders to determine the output probabilities.

In some embodiments, a set of performant database queries is used to train the NLP model. By excluding non-performant queries from training, the BERT (or other NLP) model may learn relationships only from queries that do not degrade database performance. However, in other embodiments, models may be trained using non-performant queries to determine sequences of query tokens to avoid recommending to the user. Additionally or alternatively, a model trained on non-performant queries may be used by query editor 104 to present warnings or recommendations on queries (or query portions) to avoid.

Figure 4:
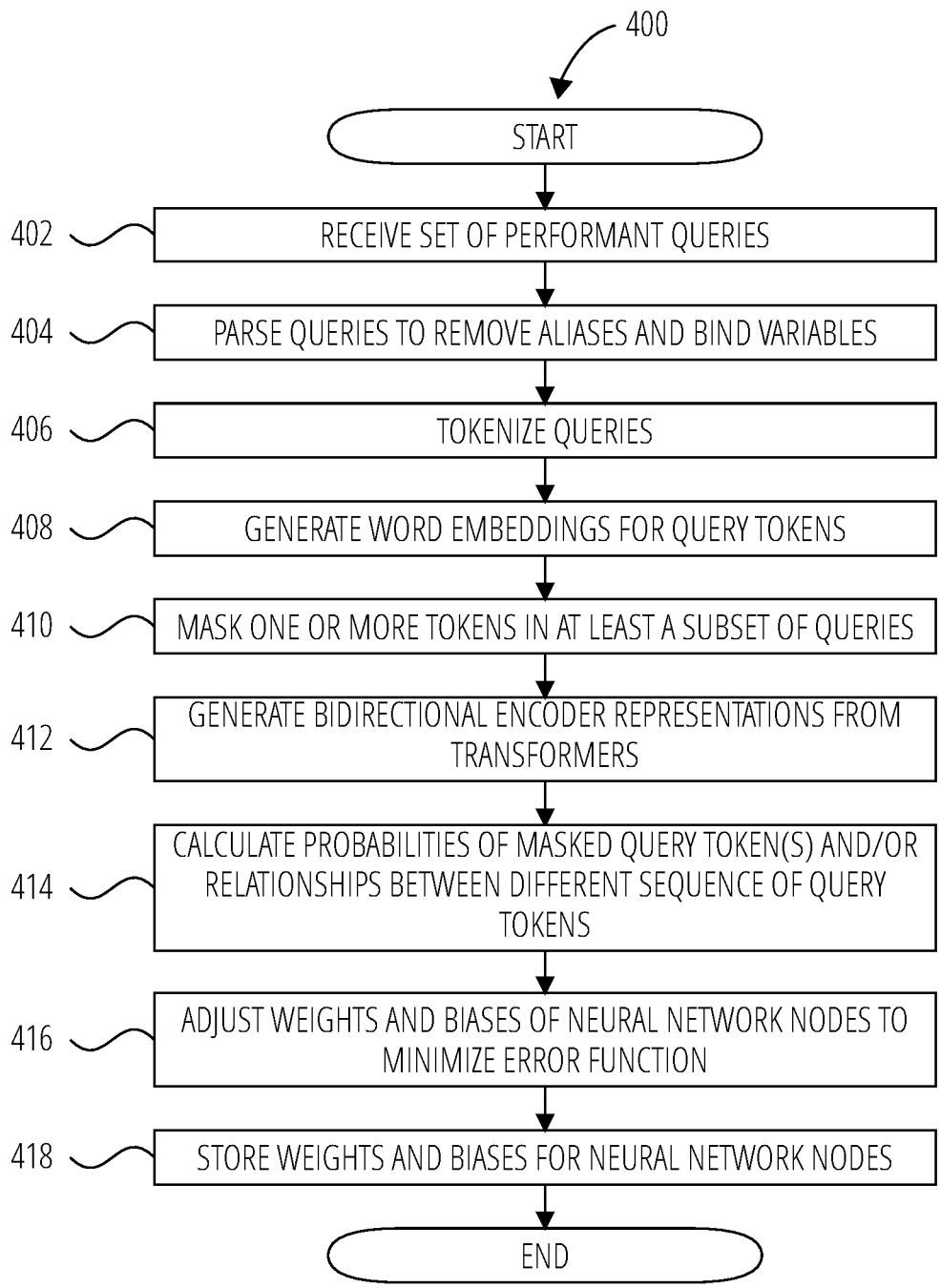
FIG. 4 illustrates a process for training a neural network model to predict query tokens for an incomplete query according to some embodiments.

FIG. 4 illustrates process 400 for training a neural network model to predict query tokens for an incomplete query according to some embodiments. One or more operations illustrated in FIG. 4 may be modified, rearranged, or omitted. Accordingly, the particular sequence of operations illustrated in FIG. 4 should not be construed as limiting the scope of one or more embodiments.

Referring to FIG. 4, process 400 receives a set of performant queries (operation 402). The set of performant queries may be the same ones used to generate query vectors 210 or a different set of queries, depending on the particular implementation.

Process 400 next parses the set of performant queries to remove aliases and bind variables (operation 404). This step may help reduce the noise associated with having different aliases/bind variable values in a SQL query. For example, the following may be a performant SQL query from a query repository:

```
SELECT t.entity_name, z.tenantId, z.me_id, z.mg_name.
z.collection_time_utc FROM system#manageable_entities m,
system#latest_marker 1 WHERE m.tenant_id=z.tenant_id AND
m.me_id=z.me_id AND t.entity_type = 'cloud_host_linux' AND
m.me_class='TARGET' AND z.mg_name='HOST_CPU'.
```

The above SQL query may then be fed through a parsing layer to convert the query as follows:

```
SELECT system#manageable_entities.entity_name,
system#latest_marker.tenantId, system#latest_marker.me_id,
system#latest_marker.mg_name,   system#latest_marker.collection_tim
e_utc FROM system#manageable_entities , system#latest_marker WHERE
system#manageable_entities.tenant_id=
system#latest_marker.tenant_id AND
system#manageable_entities.me_id= system#latest_marker.me_id AND
system#manageable_entities.entity_type = :bind AND
system#manageable_entities.me_class=:bind AND
system#latest_marker.mg_name=:bind
```

In some embodiments, process 400 tokenizes the queries (operation 406). As previously noted, a query token may correspond to one or more parts of a query including database commands, SQL expressions, and object references contained therein.

In some embodiments, process 400 generates word embeddings for each token to train the NLP neural network model (operation 408). Each word embedding may be a numerical word vector that uniquely identifies a corresponding query token. In some embodiments, positional information may be included or otherwise associated with the word embedding that indicates the position of the corresponding query token within a query.

In some embodiments, process 400 masks one or more tokens in at least a subset of the queries used to train the NLP neural network model (operation 410). Process 400 may randomly select a threshold percentage of query tokens with a [MASK] token. Other masking techniques may also be used depending on the particular implementation.

In some embodiments, process 400 generates generate bidirectional encoder representations from transformers as a function of the query tokens for each query in the training dataset (operation 412). The transformer encodings may include token embeddings encoding unique aspects of a corresponding query token, sentence embeddings encoding unique aspects of the query as a whole, and/or positional embeddings encoding positional information about the query tokens relative to query tokens to both the left and right of the query token.

In some embodiments, process 400 calculates probabilities for the masked query tokens and/or for relationships between different sequences of query tokens (operation 414). The probabilities may be computed by transformer decoder layer 308, such as by using a set of decoders and applying classification functions as previously described. Other models, such as recurrent neural networks and word2vec-based neural networks may also compute the probabilities as a function of the input ML vectors by performing forward propagation through the neural network.

In some embodiments, process 400 adjusts weights and biases of one or more nodes within the NLP neural network model to minimize an error function when applying the model to a test dataset (operation 416). For BERT models, gradient descent may be used to minimize the prediction error of the model, which may be computed using a softmax function. With gradient descent, the weight and bias changes for the neural network nodes are proportional to the error gradient, which may be determined based on the difference in prediction error when applying the model to perform next token prediction for a set of test queries. Weights and biases may be varied within neural network nodes associated with transformer encoder layer 306 and/or transformer decoder layer 308.

In some embodiments, once the error has been minimized, process 400 stores the set of weights and biases (operation 418). The stored weights and bias values may be applied to new queries, either complete or incomplete, to perform next token predictions.

3.3 Embedding Layer for Converting Queries to Numerical Vectors

In some embodiments, embedding layer 206 uses a word embedding model to generate numeric query representations for each query in a set of performant queries. Some word embedding models, such as the continuous bag-of-words and continuous skip-gram models, are designed to map words to real-valued vectors based on linguistic context determined through natural language processing. However, the words within database queries are generally not limited to literary language, but also involve structure that may be specialized to a particular computing application domain. For example, SQL is a domain-specific computer language for managing data in a relational database management system. The context of a word in a SQL query, such as SELECT, generally has a much different meaning than the same word in a literary context.

In some embodiments, embedding layer 206 includes a word embedding model trained to map query tokens to real-valued vectors based on contextual similarity. Embedding layer 206 may include a bag-of-words or skip-gram model trained using a set of queries, which may be different than the set of performant queries. However, instead of or in addition to linguistic context, embedding layer 206 may train the model based on query contexts, such as functional, structural, and relationship attributes associated with the word. Query tokens that have similar query contexts may be mapped to vectors that are closer together in the vector space than vectors for less similar query tokens. Stated another way, a vector for a query token may have a smaller Euclidean distance and/or greater cosine similarity to another vector in the vector space for a token that has a more similar query context than for a token that is not as similar.

Functional attributes may be determined based on one or more functional operations executed for a given word. For instance, database commands (e.g., SELECT, UPDATE, DELETE, and CREATE TABLE, etc.) and clauses/predicates (e.g., WHERE x=1) convey a certain functional meaning to a given SQL query. Such functional attributes may be factored in when training and applying a ML model. Thus, query tokens with similar functional contexts may be mapped to vectors that are more closely placed within the vector space.

Structural and relationship attributes may be determined based on learned and/or predefined patterns within the database. For example, database schemas and/or other metadata may define relationships between database objects. In other cases, relationships may be learned based on access patterns, such as frequent cooccurrences in joins and/or other query operations. Query tokens corresponding to related database objects may be mapped more closely together than for unrelated objects. Additionally or alternatively, other information may be used when training the model, such as the size (e.g., the number of rows) of a database object, the uniqueness of rows, and/or other object attributes.

Once trained, the word embedding model may be used to generate numerical vector representations for query tokens. For example, query token $x_1$ may be mapped to the word embedding vector 110, query token $x_2$ to 001, and query token $x_3$ to 111. In this example, query token $x_1$ and $x_3$ are closer together indicating a greater similarity in query context than to token $x_2$. It is noted that the length of the word embedding vector may be much longer and may vary depending on the particular implementation.

A given query may be represented as a set of word embedding vectors. For instance, a query comprising four query tokens may be represented by concatenating the four corresponding word embedding vectors for each token. The length of a query representation may be normalized, using padding and/or substitution, as described further herein, to facilitate processing by model 200.

Figure 5:
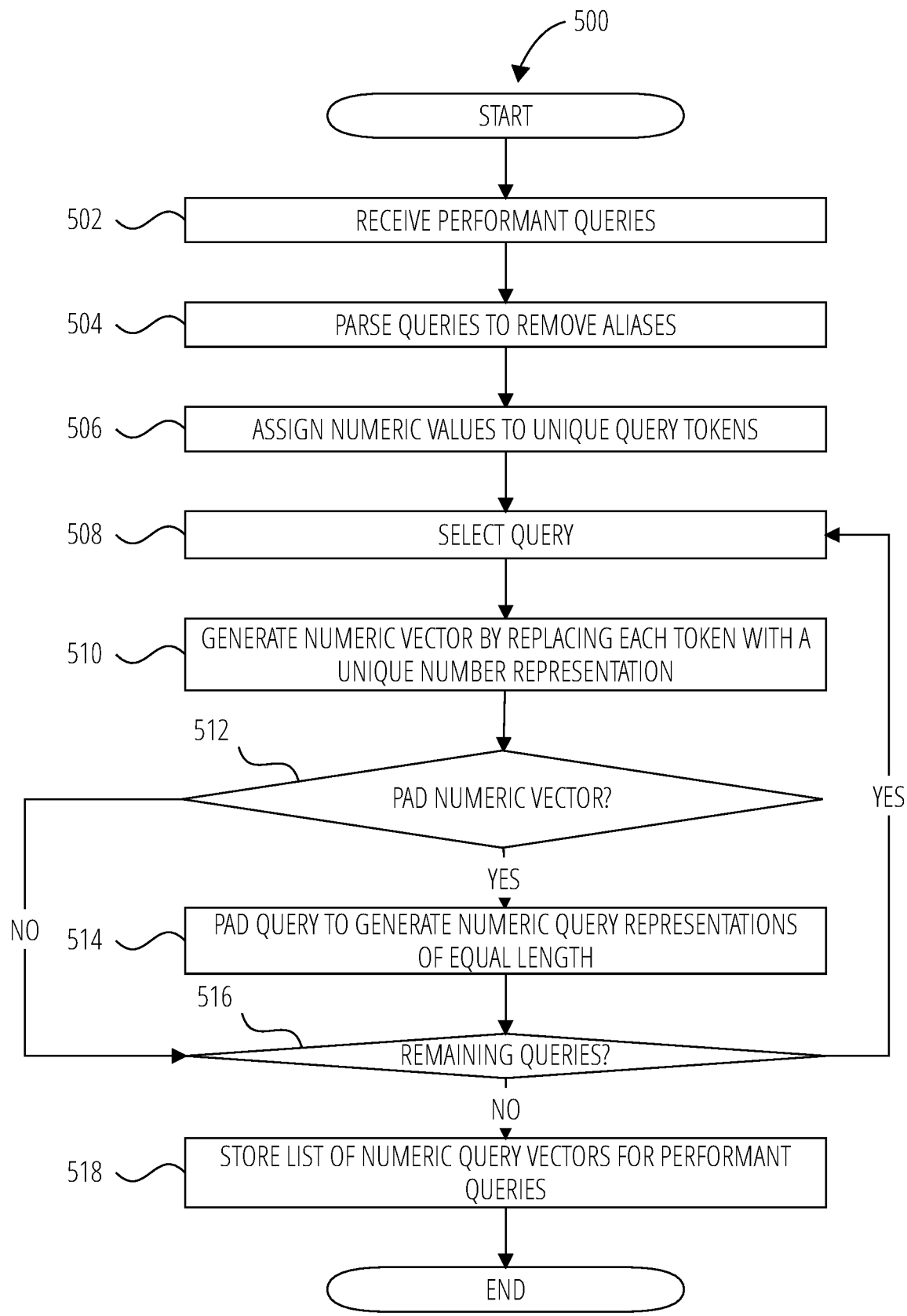
FIG. 5 illustrates a process for converting database queries to numerical vectors according to some embodiments.

FIG. 5 illustrates process 500 for converting database queries to numerical vectors according to some embodiments. One or more operations illustrated in FIG. 5 may be modified, rearranged, or omitted. Accordingly, the particular sequence of operations illustrated in FIG. 5 should not be construed as limiting the scope of one or more embodiments.

Referring to FIG. 5, process 500 receives a set of performant database queries (operation 502). As previously mentioned, the performant database queries may be of a same schema and/or from a same environment as queries submitted via editor interface 106, such as incomplete query 202.

In some embodiments, process 500 parses the query and removes aliases within the query (operation 504). The queries may be fed through the same parsing layer described with respect to operation 404 above.

In some embodiments, process 500 generates a list of unique query tokens used in the performant queries and assigns a unique number to each unique query token (operation 506). For example, the following table shows an example mapping between unique words extracted from the queries and numerical assignments:

| Word | Numerical Assignment |
|---|---|
| SELECT | 1 |
| FROM | 2 |
| WHERE | 3 |
| AND | 4 |
| bind | 5 |
| = | 6 |
| . | 7 |
| , | 8 |
| system#manageable_entities | 9 |
| entity_name | 10 |
| system#latest_marker | 11 |
| tenantId | 12 |
| me_id | 13 |
| mg_name | 14 |
| collection_time_utc | 15 |

In some embodiments, the numeric values assigned to each query token may be determined based on structural and/or relationship attributes between different query expressions, as previously described. A trained ML model may be used to determine the number assignments for each query token. Thus, more contextually similar tokens may be assigned values that are closer in distance. In other embodiments, the numbers may be arbitrarily assigned.

In some embodiments, process 500 selects a query to convert into a numerical vector (operation 508). Process 500 may iterate through the queries in any predefined or arbitrary order.

In some embodiments, process generates a numerical vector for the selected query by replacing each token with a unique number representation (operation 510). For example, based on the numerical assignments above, the following SQL query:

```
SELECT system#manageable_entities.entity_name,
system#latest_marker.tenantId, system#latest_marker.me_id,
system#latest_marker.mg_name,   system#latest_marker.collection_tim
e_utc FROM system#manageable_entities , system#latest_marker WHERE
system#manageable_entities.tenant_id=
system#latest_marker.tenant_id AND
system#manageable_entities.me_id= system#latest_marker.me_id AND
system#latest_marker.mg_name=:bind
``` may be transformed to the following query vector: [1,9,7, 10,8,11,7,12,8,11,7,13,8,11,7,14,8, 11,7,15,2,9,8,11,3,9,7, 12,6,11,7,12,4,9,6,13,6,11,7,13,4,11,7,14,6,5]

In some embodiments, process 500 determines whether to pad the numeric query vector (operation 512). Numeric vectors may be padded to create query representations of equal length, which may be easier to process when performing similarity computations within a computing system. A threshold length may be set based on the longest query in the set of performant queries. For example, if the longest query has 100 tokens, then a length of 100 may be set. However, other thresholds may be used that are longer than the longest query in the set of performant queries to accommodate longer queries that may be subsequently added.

If the numeric vector representation is shorter in length than the threshold, then process 500 pads the query (operation 514). In some embodiments, process 500 left-pads the query by adding zeros. For example the vector representation above may be left-padded as follows: [ . . . 0,0,0,0,0, 0,0,0,0,0,1,9,7,10,8,11,7,12,8,11,7,13,8,11,7,14,8, 11,7,15, 2,9,8,11,3,9,7,12,6,11,7,12,4,9,6,13,6,11,7,13,4,11,7,14,6, 5]. The number of zeros added may vary depending on the length of the vector, with more zeros being added the shorter the initial query vector to obtain normalized query vectors of equal length.

In some embodiments, process 500 determines whether there are remaining queries to process (operation 516). If there are remaining queries, process 500 returns to operation 508 to generate a numeric vector for the next query that is selected.

Once all the queries have been processed, process 500 stores a list of the numeric query vectors for the set of performant queries (operation 518). The query vectors may be used to perform similarity computations as described further herein.

3.4 Model Tuning

Figure 6:
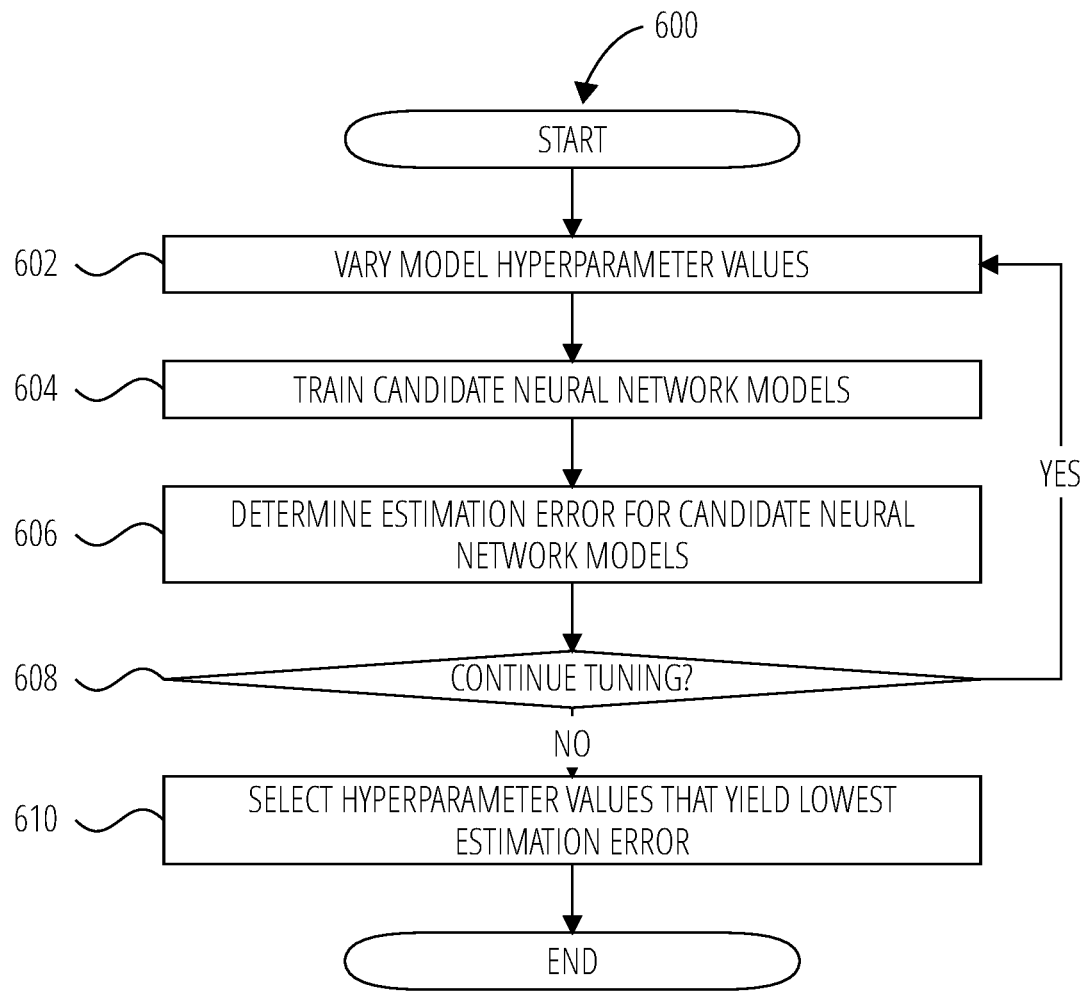
FIG. 6 illustrates a process for tuning a machine learning model according to some embodiments.

ML engine 122 may be configured to tune one or more model hyperparameter values to optimize model performance. FIG. 6 illustrates process 600 for tuning a machine learning model according to some embodiments. One or more operations illustrated in FIG. 6 may be modified, rearranged, or omitted. Accordingly, the particular sequence of operations illustrated in FIG. 6 should not be construed as limiting the scope of one or more embodiments.

The tuning process includes varying one or more hyperparameter values (operation 602). A hyperparameter in this context refers to a value that is set before training begins. Example hyperparameters for a BERT-based neural network model include the learning rate, weighted decay of the model, and the number of training epochs. The hyperparameter attributes and manner in which they are varied may depend on the particular implementation. In other embodiments, a default set of hyperparameter values may be used without tuning.

In some embodiments, process 600 trains a candidate model using the new hyperparameter values (operation 604). For example, ML engine 122 may train a neural network at the NLP prediction layer 204 according to the process depicted in FIG. 4 using the new hyperparameter values.

In some embodiments, process 600 determines the estimation error for the candidate model (operation 606). To determine the estimation error, the process may generate estimates for a testing dataset. A testing dataset may include examples that were not used to train the candidate models but for which labels are known. The tuning process may generate a prediction for a respective example in the testing dataset using the candidate model that was trained based on the new hyperparameter value(s) and compare it to the respective known labels. The estimation error for an example in a testing dataset may be computed as a function of the difference between the estimated label and the known label. The estimation error for the candidate model may be computed as the average of the estimation error across all examples in the testing dataset.

In some embodiments, process 600 determines whether to continue tuning (operation 608). For example, the tuning process may iterate through various predefined combinations of hyperparameter values. Additionally or alternatively an estimation error threshold may be set where tuning may stop if the estimation error for one or more of the candidate models is below a threshold.

In some embodiments, process 600 selects the candidate model with the lowest estimation error (operation 610). The selected model may then be used to evaluate new documents according to the corresponding hyperparameter values and the corresponding cell parameters obtained via the training process.

4.0 Real-Time Query Composition and Editing Using Machine Learning

In some embodiments, query editor 104 may use the trained model 200 to guide the composition, editing, and optimization of database queries. Query editor 104 may provide hints or suggestions to user in real-time as the user is typing a query via editor interface 106. For example, the user may type "SELECT" and instantly be presented with a set of suggestions for completing the query. The user may select one of the suggestions or continue typing additional query tokens. As the user enters additional tokens, the suggestions presented via editor interface 106 may be updated by reapplying the model to the new sequence of query tokens. Additionally or alternatively, query editor 104 may be configured to provide hints or suggestions only after a user has explicitly requested it. Query editor 104 may give the user the option to change the mode in which recommendations are presented or a default mode may be implemented depending on the implementation.

Figure 7:
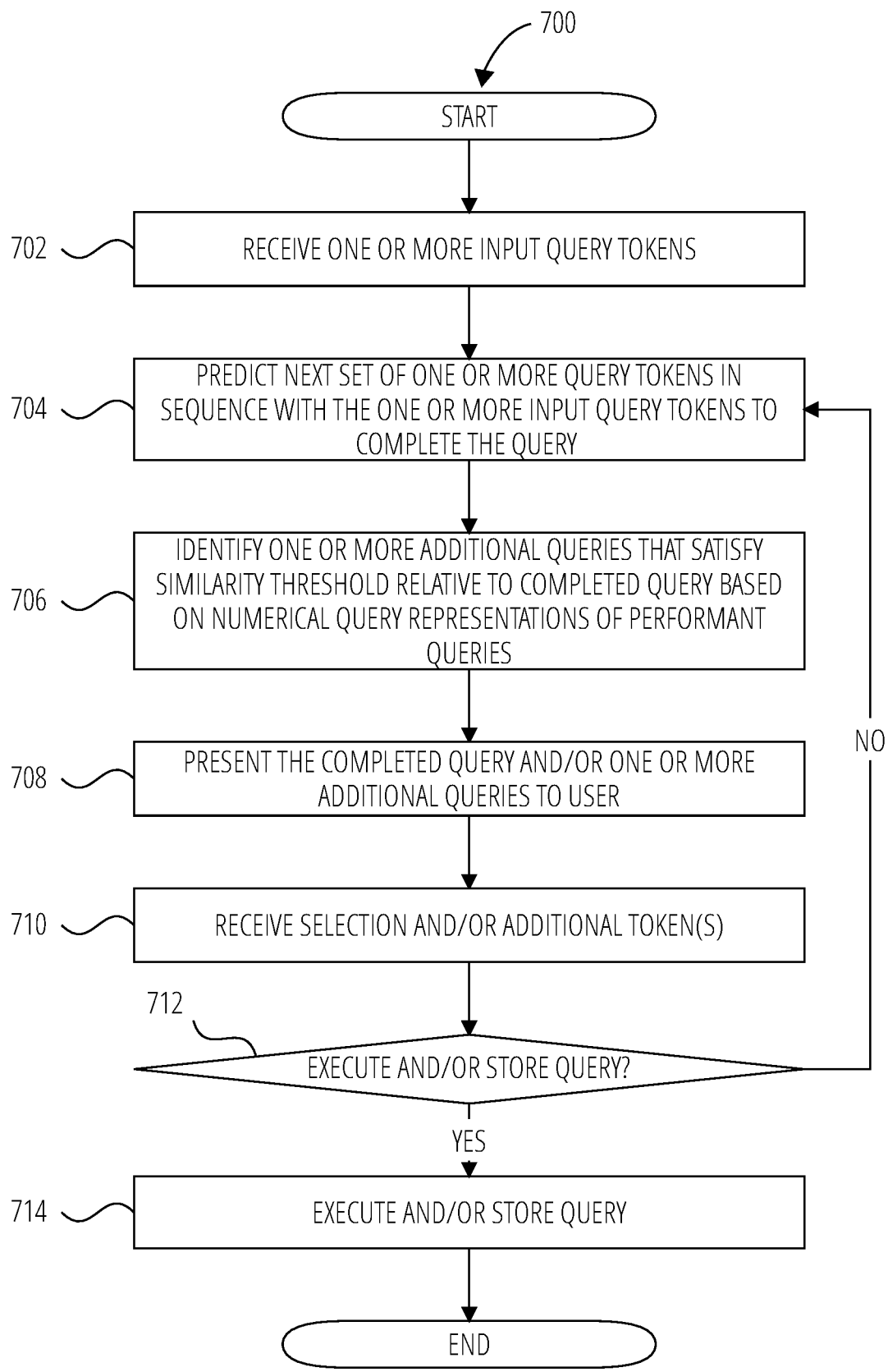
FIG. 7 illustrates a process for editing and optimizing queries in real time as a query is being written according to some embodiments.

FIG. 7 illustrates process 700 for editing and optimizing queries in real time as a query is being written according to some embodiments. One or more operations illustrated in FIG. 7 may be modified, rearranged, or omitted. Accordingly, the particular sequence of operations illustrated in FIG. 7 should not be construed as limiting the scope of one or more embodiments.

Referring to FIG. 7, process 700 receives one or more input query tokens (operation 702). The user may then request suggestions for editing, completing, expanding or otherwise augmenting the SQL, such as by clicking on a "Suggest" button or another user interface element in editor interface 106. In other embodiments, the suggestions may be automatically generated and presented as the user is typing the SQL.

In some embodiments, process 700 predicts the next set of one or more query tokens in sequence with the one or more input query tokens to complete the query (operation 704). Process 700 may use the trained NLP prediction model, such as the BERT-based neural network previously described, to perform the prediction. The set of one or more query tokens may be converted to ML vectors, which may be fed through transformer encoding layer 306 which applies the set of weights and/or biases on a forward pass through the neural network nodes to generate token encodings. The transformer encodings may then be fed through the transformer decoding layer 308, which may also apply a set of weights and biases, a lineal transformation, and/or a softmax function to generate the next token predictions. As previously noted, other models, such as recurrent neural networks and word2vec-based neural networks, may be used to generate the predictions at this stage.

In some embodiments, process 700 identifies one or more additional queries that satisfy a similarity threshold relative to completed query based on numerical query representations of performant queries (operation 706). Process 700 may identify the queries by converting the autocompleted query output by the NLP model into a numerical query vector. A cosine similarity, Euclidean distance, and/or other similarity measure may then be computed between the vector representation of the autocompleted query and vector representations for the set of performance queries.

In some embodiments, process 700 may skip operation 706. In this case, process 700 generates an autocompleted query based on the output of the NLP model but may proceed without finding similar queries based on query vector comparisons. The user may be allowed to select between the different modes, or a single mode may be implemented within an application, depending on the particular implementation.

In some embodiments, process 700 presents the completed query and/or one or more additional queries to user (operation 708). In some embodiments, both the autocompleted query and similar queries are presented to the user. However, in other embodiments, only the autocompleted query or the similar queries extracted from the list of predefined queries may be presented. The autocompleted query may or may not be included in the list of performant queries, depending on the output of the trained NLP model.

In some embodiments, process 700 receives selection and/or additional token(s) (operation 710). For example, the user may select a query that is presented via editor interface 106 or continue editing the query manually. In other cases, the user may continue with the query as currently composed without selecting a query or adding further tokens.

In some embodiments, process 700 determines whether to execute and/or store the query (operation 712). For example, a user may request to execute a selected query. In response, the query may be passed to query engine 112 for execution. In other cases, a user may request further suggestions for editing the query. In this case, process 700 may return to operation 704 to generate an updated recommendation based on the new combination of tokens in the selected query. The user may iterate through this process multiple times to augment or otherwise modify the query via editor interface 106.

Once the user has finalized the query, process 700 executes and/or store query (operation 714). The above techniques allow users to select from among a plurality of performant queries, which help avoids the use of costly SQL expressions or combinations that degrade the performance of the database. Further, the selection may help speed up query composition, since the user does not have to manually type the SQL statements, while preventing typographical and syntactic errors.

As an example of process 700, a user may input the following incomplete SQL via editor interface 106:

```
SELECT system#manageable_entities.entity_name,
system#latest_marker.tenantId, system#latest_marker.me_id,
system#latest_marker.mg_name,    system#latest_marker.collection_tim
e_utc FROM system#manageable_entities , system#latest_marker WHERE
```

Process 700 may be run to generate and present the following recommended SQL queries:

```
1. SELECT system#manageable_entities.entity_name,
   system#latest_marker.tenantId, system#latest_marker.me_id,
   system#latest_marker.mg_name, system#latest_marker.collection_
   time_utc FROM system#manageable_entities , system#latest_marker
   WHERE system#manageable_entities.tenant_id=
   system#latest_marker.tenant_id
2. SELECT system#manageable_entities.entity_name,
   system#latest_marker.tenantId, system#latest_marker.me_id,
   system#latest_marker.mg_name,    system#latest_marker.collection_
   time_utc FROM system#manageable_entities , system#latest_marker
   WHERE system#manageable_entities.me_id=
   system#latest_marker.me_id
3. SELECT system#manageable_entities.entity_name,
   system#latest_marker.tenantId, system#latest_marker.me_id,
   system#latest_marker.mg_name,    system#latest_marker.collection_
   time_utc FROM system#manageable_entities , system#latest_marker
   WHERE system#manageable_entities.tenant_id=
   system#latest_marker.tenant_id AND
   system#manageable_entities.me_id= system#latest_marker.me_id
4. SELECT system#manageable_entities.entity_name,
   system#latest_marker.tenantId, system#latest_marker.me_id,
   system#latest_marker.mg_name,    system#latest_marker.collection_
   time_utc FROM system#manageable_entities , system#latest_marker
   WHERE system#manageable_entities.tenant_id=
   system#latest_marker.tenant_id AND
   system#manageable_entities.me_id= system#latest_marker.me_id
   AND system#latest_marker.collection_time_utc > :bind
5. SELECT system#manageable_entities.entity_name,
   system#latest_marker.tenantId, system#latest_marker.me_id,
   system#latest_marker.mg_name,    system#latest_marker.collection_t
   ime_utc FROM system#manageable_entities , system#latest_marker
   WHERE system#manageable_entities.tenant_id=
   system#latest_marker.tenant_id AND system#latest_marker.mg_name
   =:bind
```

In response to being presented with the above suggestions, the user may select the following query:

```
SELECT system#manageable_entities.entity_name,
system#latest_marker.tenantId, system#latest_marker.me_id,
system#latest_marker.mg_name,    system#latest_marker.collection_tim
e_utc FROM system#manageable_entities , system#latest_marker
WHERE system#manageable_entities.tenant_id=
system#latest_marker.tenant_id AND
system#manageable_entities.me_id= system#latest_marker.me_id
```

The user may subsequently request additional suggestions for the selected query, or the suggestions may be triggered automatically responsive to the selection. For example, query editor 104 may present the following suggestions to expand the selected query example above:

1. SELECT system#manageable_entities.entity_name,
   system#latest_marker.tenantId, system#latest_marker.me_id,
   system#latest_marker.mg_name,   system#latest_marker.collection_
   time_utc FROM system#manageable_entities , system#latest_marker
   WHERE system#manageable_entities.tenant_id=
   system#latest_marker.tenant_id AND
   system#manageable_entities.me_id= system#latest_marker.me_id AND
   system#latest_marker.mg_name=:bind AND
   system#manageable_entities.tenant_id = :bind
2. SELECT system#manageable_entities.entity_name,
   system#latest_marker.tenantId, system#latest_marker.me_id,
   system#latest_marker.mg_name,   system#latest_marker.collection_
   time_utc FROM system#manageable_entities , system#latest_marker
   WHERE system#manageable_entities.tenant_id=
   system#latest_marker.tenant_id AND
   system#manageable_entities.me_id= system#latest_marker.me_id AND
   system#manageable_entities.me_id= =: bind AND
   system#manageable_entities.tenant_id = :bind
3. SELECT system#manageable_entities.entity_name,
   system#latest_marker.tenantId, system#latest_marker.me_id,
   system#latest_marker.mg_name,   system#latest_marker.collection_
   time_utc FROM system#manageable_entities , system#latest_marker
   WHERE system#manageable_entities.tenant_id=
   system#latest_marker.tenant_id AND
   system#manageable_entities.me_id= system#latest_marker.me_id AND
   system#manageable_entities.me_id= =: bind AND
   system#manageable_entities.tenant_id = :bind AND
   system#latest_marker.mg_name=:bind
4. SELECT system#manageable_entities.entity_name,
   system#latest_marker.tenantId, system#latest_marker.me_id,
   system#latest_marker.mg_name, system#latest_marker.collection_
   time_utc FROM system#manageable_entities , system#latest_marker
   WHERE system#manageable_entities.tenant_id=
   system#latest_marker.tenant_id AND
   system#manageable_entities.me_id= system#latest_marker.me_id AND
   system#manageable_entities. entity_name = =:bind AND
   system#latest_marker.mg_name=:bind AND
   system#manageable_entities.tenant_id = :bind
5. SELECT system#manageable_entities.entity_name,
   system#latest_marker.tenantId, system#latest_marker.me_id,
   system#latest_marker.mg_name,   system#latest_marker.collection_t
   ime_utc FROM system#manageable_entities , system#latest_marker
   WHERE system#manageable_entities.tenant_id=
   system#latest_marker.tenant_id AND
   system#manageable_entities.me_id= system#latest_marker.me_id AND
   system#manageable_entities. entity_name = =:bind AND
   system#manageable_entities.tenant_id = :bind The user may then select one of the SQLs above and finalize it by replacing the bind placeholders with variables. Once finalized, the query may be executed and/or saved for later use.

5.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud.

In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other.

These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In some embodiments, the trigger, when satisfied, might output data for consumption by the target microservice. In other embodiments, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7.0 Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
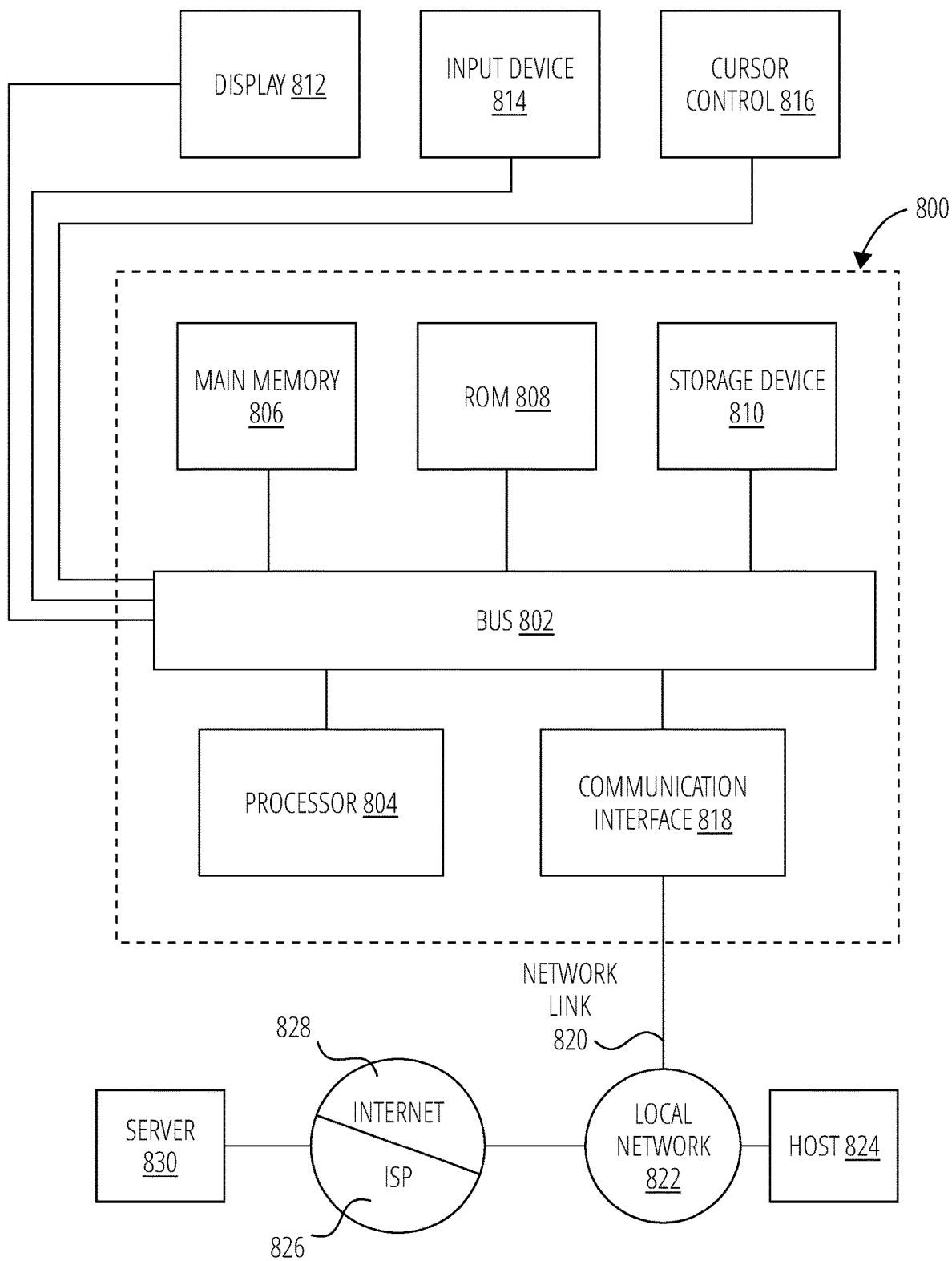
FIG. 8 illustrates a computer system on which embodiments may be implemented.

For example, FIG. 8 is a block diagram that illustrates computer system 800 upon which embodiments may be implemented. Computer system 800 includes bus 802 or other communication mechanism for communicating information, and a hardware processor 804 coupled with bus 802 for processing information. Hardware processor 804 may be, for example, a general-purpose microprocessor.

Computer system 800 also includes main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light emitting diode (LED) monitor, for displaying information to a computer user. Input device 814, which may include alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. Input device 814 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to some embodiments, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 800 can receive the data on the network line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

8.0 Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    training a neural network using a set of queries that have been labeled as performant, wherein the queries are automatically labeled based on runtime performance metrics associated with executing the queries within a computing environment;
    receiving, from a user, an incomplete query comprising a first set of one or more query tokens;
    responsive to receiving the incomplete query, generating, by the neural network model based at least in part on the first set of one or more query tokens, a prediction of a second set of one or more query tokens for completing the incomplete query to form a completed query;
    identifying a set of one or more queries that satisfy a similarity threshold relative to the completed query; and
    presenting, to the user, the completed query and the set of one or more queries that satisfy the similarity threshold relative to the completed query.

2. The method of claim 1, further comprising: receiving input identifying a selected query corresponding to one of the completed query or a query from the set of one or more queries; and responsive to receiving the input, executing the selected query.

3. The method of claim 1, further comprising: receiving input identifying a selected query corresponding to one of the completed query or a query from the set of one or more queries; and responsive to receiving the input, generating, by the neural network model based at least in part on tokens in the selected query, a second prediction of a third set of one or more query tokens to add to the selected query for augmenting the selected query.

4. The method of claim 1, wherein at least a subset of the labeled queries have domain-specific labels indicating that the subset is performant within a specific domain in which an application is executing.

5. The method of claim 1, wherein the neural network model includes bidirectional encoder representations from transformers.

6. The method of claim 1, wherein the first set of one or more tokens and the second set of one or more tokens include structured query language expressions.

7. The method of claim 1, wherein identifying the set of one or more queries that satisfy a similarity threshold relative to the completed query comprises generating a feature vector for the completed query based at least on the first set of one or more query tokens and the second set of one or more query tokens; and comparing the feature vector to a plurality of other feature vectors to identify at least one other query with a corresponding feature vector that is closest to the feature vector for the completed query.

8. The method of claim 1, wherein the completed query includes the first set of one or more query tokens; and wherein at least one query in the set of one or more queries does not include at least one query token in the first set of one or more query tokens.

9. A non-transitory computer-readable storage medium storing instructions that when executed by one or more hardware processors, cause:
    training a neural network using a set of queries that have been labeled as performant, wherein the queries are automatically labeled based on runtime performance metrics associated with executing the queries within a computing environment;
    receiving, from a user, an incomplete query comprising a first set of one or more query tokens;
    responsive to receiving the incomplete query, generating, by the neural network model based at least in part on the first set of one or more query tokens, a prediction of a second set of one or more query tokens for completing the incomplete query to form a completed query;
    identifying a set of one or more queries that satisfy a similarity threshold relative to the completed query; and
    presenting, to the user, the completed query and the set of one or more queries that satisfy the similarity threshold relative to the completed query.

10. The computer-readable storage medium of claim 9, wherein the instructions further cause: receiving input identifying a selected query corresponding to one of the completed query or a query from the set of one or more queries; and responsive to receiving the input, executing the selected query.

11. The computer-readable storage medium of claim 9, wherein the instructions further cause: receiving input identifying a selected query corresponding to one of the completed query or a query from the set of one or more queries; and responsive to receiving the input, generating, by the neural network model based at least in part on tokens in the selected query, a second prediction of a third set of one or more query tokens to add to the selected query for augmenting the selected query.

12. The computer-readable storage medium of claim 9, wherein at least a subset of the labeled queries have domain-specific labels indicate that the subset is performant within a specific domain in which an application is executing.

13. The computer-readable storage medium of claim 9, wherein the neural network model includes bidirectional encoder representations from transformers.

14. The computer-readable storage medium of claim 9, wherein the first set of one or more tokens and the second set of one or more tokens include structured query language expressions.

15. The computer-readable storage medium of claim 9, wherein identifying the set of one or more queries that satisfy a similarity threshold relative to the completed query comprises generating a feature vector for the completed query based at least on the first set of one or more query tokens and the second set of one or more query tokens; and comparing the feature vector to a plurality of other feature vectors to identify at least one other query with a corresponding feature vector that is closest to the feature vector for the completed query.

16. The computer-readable storage medium of claim 9, wherein the completed query includes the first set of one or more query tokens; and wherein at least one query in the set of one or more queries does not include at least one query token in the first set of one or more query tokens.

17. A non-transitory computer-readable storage medium storing instructions that when executed by one or more hardware processors, cause:
    receiving, from a user, an incomplete query comprising a first set of one or more query tokens;
    responsive to receiving the incomplete query, generating, by a neural network model based at least in part on the first set of one or more query tokens, a prediction of a second set of one or more query tokens for completing the incomplete query to form a completed query, wherein the neural network model includes bidirectional encoder representations from transformers;
    identifying a set of one or more queries that satisfy a similarity threshold relative to the completed query; and
    presenting, to the user, the completed query and the set of one or more queries that satisfy the similarity threshold relative to the completed query.

18. The computer-readable storage medium of claim 17, further comprising: receiving input identifying a selected query corresponding to one of the completed query or a query from the set of one or more queries; and responsive to receiving the input, executing the selected query.

19. The computer-readable storage medium of claim 17, further comprising: receiving input identifying a selected query corresponding to one of the completed query or a query from the set of one or more queries; and responsive to receiving the input, generating, by the neural network model based at least in part on tokens in the selected query, a second prediction of a third set of one or more query tokens to add to the selected query for augmenting the selected query.

20. The computer-readable storage medium of claim 17, wherein the completed query includes the first set of one or more query tokens; and wherein at least one query in the set of one or more queries does not include at least one query token in the first set of one or more query tokens.

\* \* \* \* \*